United States Patent [19]

Anderson

[11] 4,023,333

[45] May 17, 1977

[54] FLOATING SICKLE DRIVE

[75] Inventor: Charles Merton Anderson, Mankato, Minn.

[73] Assignee: Year-A-Round Cab Corporation, Mankato, Minn.

[22] Filed: Apr. 14, 1975

[21] Appl. No.: 567,625

[52] U.S. Cl. .................................. 56/296; 74/60; 56/208

[51] Int. Cl.[2] ....................................... A01D 55/02

[58] Field of Search ............ 56/296, 303, 257, 258, 56/208; 74/60

[56] References Cited

UNITED STATES PATENTS

| | | | |
|---|---|---|---|
| 1,289,745 | 12/1918 | Harer | 56/303 |
| 2,681,542 | 6/1954 | Heth | 56/208 X |
| 2,850,864 | 9/1958 | Rohweder | 56/296 |
| 3,176,452 | 4/1965 | Wathen et al. | 56/208 X |
| 3,397,584 | 8/1968 | Koch | 74/60 |
| 3,444,676 | 5/1969 | Hale et al. | 56/296 |
| 3,780,508 | 12/1973 | Tashiro | 56/208 |

*Primary Examiner*—Russell R. Kinsey
*Attorney, Agent, or Firm*—Orrin M. Haugen

[57] ABSTRACT

A drive means and mounting therefor for converting rotational drive motion to linear reciprocatory motion for driving tool means in linear reciprocatory motion relative to frame or cutting bar means. The drive means includes a wobble shaft drive assembly mounted directly on the cutting bar, the drive assembly having a drive shaft with the typical axial offset portion, and with gimbal means including a generally "U" shaped yoke member coupled to a drive bearing which is secured to the axial offset shaft portion. Connecting arm means are arranged in generally axially aligned relationship with the tool means, and first and second ball joints are utilized to couple the yoke to the reciprocating tool means. In this fashion, the cutting bar provides a rigid mount for the wobble shaft drive means and positive vibration-free drive motion is provided.

11 Claims, 6 Drawing Figures

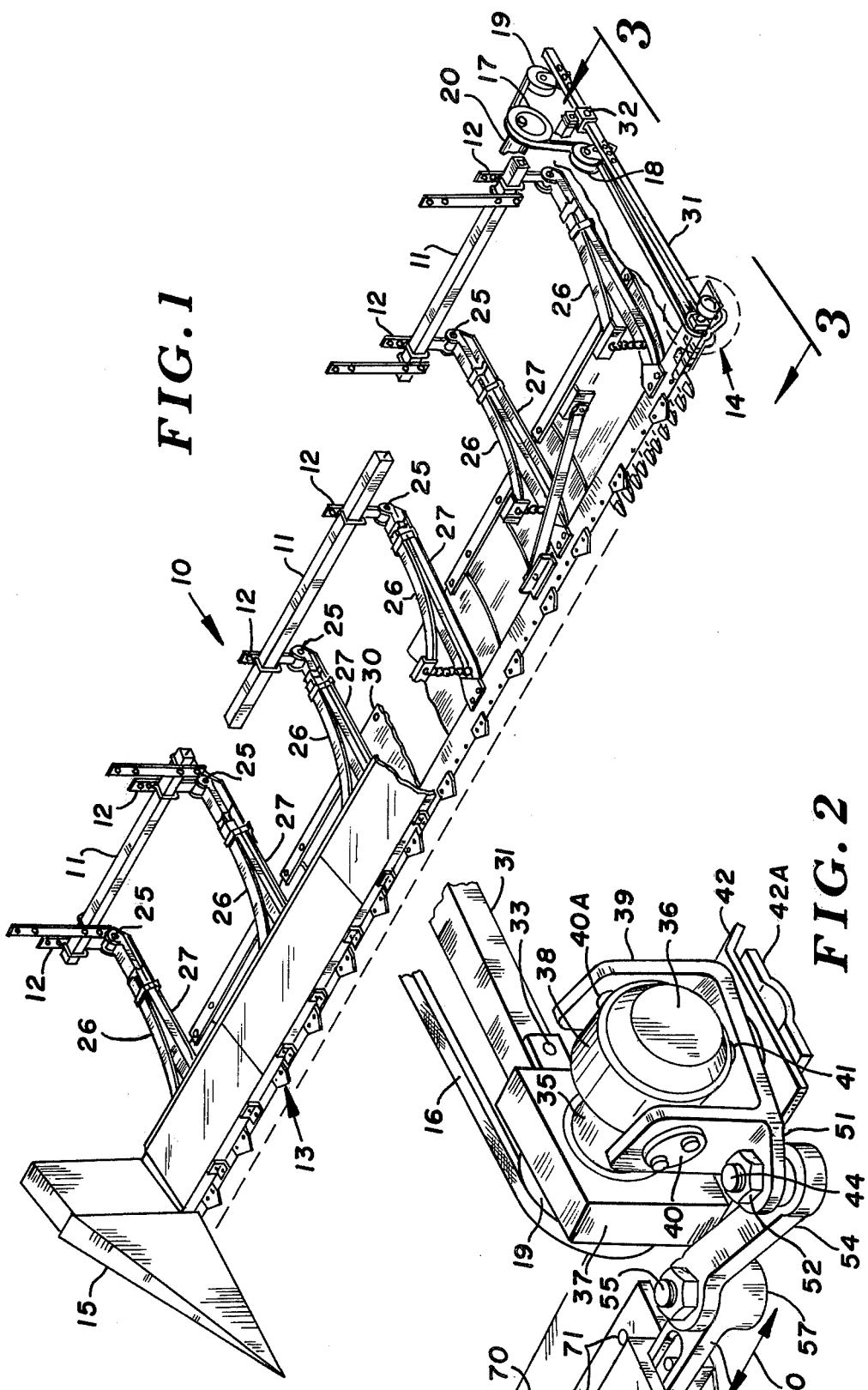

FLOATING SICKLE DRIVE

BACKGROUND OF THE INVENTION

The present invention relates generally to an improved reciprocatory drive means and mounting therefor, and more particularly to a wobble shaft drive which is designed for use with heavy inertial loaded driven members, with the drive system providing positive drive motion to the driven member in a fashion which is substantially free of shock loading during change of direction, and thus functions substantially free of vibration.

The present invention is particularly adaptable for drive means wherein a relatively heavy elongated tool member is being driven along a reciprocatory path relative to a cutting bar member and wherein the drive means is mounted on the cutting bar member.

Typical of such applications is a sickle bar assembly wherein the cutter bar is driven along a reciprocatory cutting path relative to a cutting bar. In such an arrangement, therefore, the drive means of the present invention is coupled directly to the cutting bar, while reciprocatory motion is imparted to the cutter. The nature of the motion is essentially sine wave motion, and wherein closely aligned coupling between the drive means and the driven member provide for positive and substantially vibration-free operation.

The drive means of the present invention is ideally suited for use with a floating sickle bar system and for direct mounting on the cutting bar. Normally, a remote source of rotary motion is utilized to drive the mechanism, with a convenient drive pulley arrangement being capable of utilization.

Sickle bar arrangements are frequently used in the harvesting of cash or other crops, including such crops as soybeans, peas, milo or the like. Such devices are also widely used in weed cutting. In the past, it has been traditional to utilize a Pitman type drive wherein the sickle bar is braced by means of a brace-rod or stabilizer which is coupled between the frame of the harvesting machine and a point along the sickle bar frame. The coupling to the frame portion of the harvesting machine is generally disposed laterally outwardly and at an elevation above that at the point where energy or drive motion is being applied to the cutter bar. These arrangements have generally been unsatisfactory due to warping, flexing, or permanent deformation of the bracing rods, thus contributing to vibration, excessive wear, loss of timing, and ultimately to the creation of a substantial quantity of lost-motion in the drive arrangement and the presence of a substantial number of wearing components. The need for such brace-rods and stabilizers is eliminated since the drive is mounted directly to the cutting bar, and timing and alignment is preserved and constant.

In order to enhance the coupling arrangement between the wobble shaft and the driven member, a pair of ball and socket joints are provided which, when functioning together, deliver linear reciprocatory motion to the driven member, and with the motion being, as previously indicated, sine-wave motion free of abrupt changes of direction.

SUMMARY OF THE INVENTION

Briefly, in accordance with the present invention, an improved drive means and mounting means therefor is provided which converts rotational drive motion to linear reciprocatory motion, and is particularly effective for driving axially elongated cutting tool means along a linear reciprocatory path. A wobble shaft drive means is provided which includes the typical axial offset shaft portion, and with gimbal means including a generally "U" shaped yoke member being coupled to a drive bearing disposed fast on the axial offset shaft portion. The main portion of the wobble shaft drive means is, in turn, coupled directly and securely to the cutting bar which is provided for the reciprocating tool means. A connecting arm assembly is provided with the assembly including first and second links which are disposed in generally axially aligned relationship with the cutting tool means. First and second ball and socket joints are provided in order to take up the rotational components of the wobble shaft output, and thus deliver linear reciprocatory motion only to the cutting tool means. In this manner, therefore, it is designed to employ guide means which maintain proper alignment between the elongated cutting tool member and the cutting bar.

While endless belt drive systems are normally to be preferred for their availability, simplicity and versatility, it will also be appreciated that other drive means including chain drive, hydraulic motor drives and the like may be employed for imparting rotational motion to the wobble shaft. In the modification illustrated herein, however, endless belt drives are employed, inasmuch as such drives are normally preferred. It will be apparent that certain other applications may dictate that more positive drive means be employed, such as timing belt drives, chain and sprocket drives or the like. In still other applications, therefore, hydraulic motor drives may be required because of the availability of power or the like.

Therefore, it is a primary object of the present invention to provide an improved drive means for converting rotational drive motion to linear reciprocatory motion, and wherein wobble shaft drive means and coupling means are provided which permit the mounting of the wobble shaft drive means directly to the cutting bar and adjacent to the relatively movable cutting tool member to be driven with the linear reciprocatory motion.

It is yet a further object of the present invention to provide an improved drive means for converting rotational drive motion to linear reciprocatory motion wherein a cutting bar is provided along with an axially elongated cutting tool means, and wherein the drive means includes a wobble shaft drive means coupled directly to the cutting bar, and having output drive train means for delivering linear reciprocatory motion directly to the axially elongated cutting tool means.

It is yet a further object of the present invention to provide an improved drive means for converting rotational drive motion to linear reciprocatory motion wherein wobble shaft drive means are employed with gimbal means including a generally "U" shaped yoke member operatively coupled to the wobble shaft means, and wherein connecting arm linkage means having first and second ball and socket joints are provided for coupling the yoke member to the member receiving linear reciprocatory motion.

Other and further objects of the present invention will become apparent to those skilled in the art upon a study of the following specification, appended claims, and accompanying drawings.

BRIEF DESCRIPTION OF THE DRAWINGS

FIG. 1 is a perspective view of a typical application of the improved drive means of the present invention, and illustrating the drive means mounted directly on the cutting bar and remote from the source of rotary motion, the drive being in operative association with a floating sickle bar having an elongated cutting tool as an operative feature;

FIG. 2 is a detail perspective view on an enlarged scale and illustrating the wobble shaft drive means and associated linkage members of the present invention, with the substance of FIG. 2 being taken from the phantom encircled portion at the lower right of FIG. 1;

DESCRIPTION OF THE PREFERRED EMBODIMENT

Figure 3:
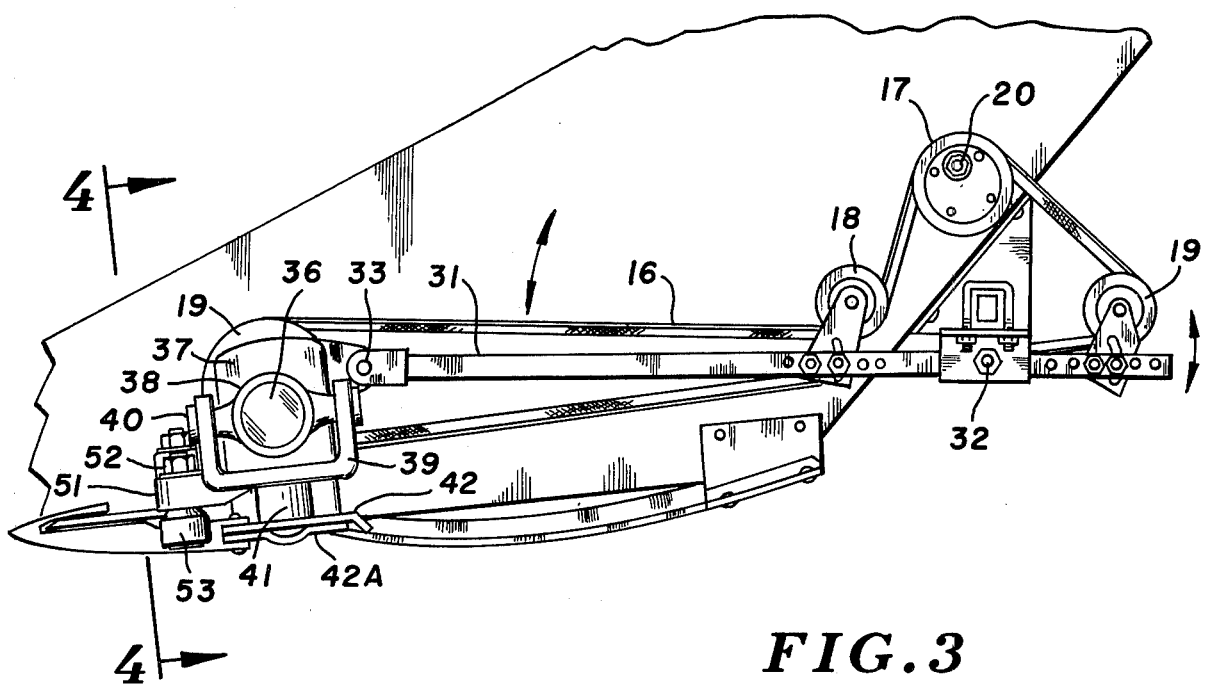
FIG. 3 is a side elevational view, partially broken away and on a slightly enlarged scale, with FIG. 3 being taken along the line and in the direction of the arrows 3—3 of FIG. 1 and illustrating details of the belt drive.

As has been previously indicated, the drive means of the present invention has application to a variety of drive systems wherein it is desired that rotary motion be converted to linear reciprocatory motion. A typically preferred application of the drive means is in combination with a sickle bar, and particularly wherein the drive means is mounted directly on the cutting bar, and wherein the output is coupled directly to the reciprocating cutter.

Accordingly, with attention being directed to FIG. 1 of the drawings, it will be seen that the drive means of the present invention is coupled to a cutter device generally designated 10, which in turn is shown mounted upon a transverse mounting bracket or cross-member 11, and with other frame supporting elements or members of the cutter 10 being suspended from rod or bracket 11 by means of hanger brackets 12—12. Other transversely disposed mounting brackets are also coupled to cross-member 11 for the purpose of demountably attaching the cutter to a supporting implement or vehicle such as a combine or other self-propelled device arranged for harvesting a cash crop such as soybeans, peas, wheat or the like. At the forward portion of the cutter 10, there are disposed individual cutters or blades such as illustrated at 13, with the individual cutters being operatively secured to a transversely extending cutter bar 13A. The cutter bar 13A is driven or powered by means of the wobble shaft assembly generally designated 14. Also, as is apparent, the entire cutter assembly is flanked by a pair of dividers such as divider 15 illustrated in FIG. 1. A similar divider is provided at the opposed end of the cutter, such as at the left end of the sickle bar, however this divider is shown as having been removed in order to better facilitate the description of the device.

An endless main belt drive 16 is illustrated in the assembly, belt 16 being, in turn, driven by pulley 17. As will be described in greater detail hereinafter, pulley 17 may be provided in the form of any conventional pulley including the concentric with shaft 20 and thus pulley illustrated in FIG. 6, this pulley 17 being capable of delivering concentric drive motion to belt 16 from an eccentric drive. Also, as will be described in greater detail hereinafter, pulley idler members 18 and 19 are provided (see FIG. 3) in order to provide constant tautness in belt 16. Also, as is shown in FIG. 3, pulley 17 is fast on shaft 20, with shaft 20 being powered by the powered shaft of a power source, an idler shaft powered by a ground-engaging wheel, or, in certain instances, being a powered drive shaft from a separate source of power. It will be appreciated, of course, that the manner of delivering power to belt 16 is not critical, and any suitable power source may be utilized for this purpose.

Because of the versatility of the drive means of the present invention, a floating cutter may be powered and driven by this drive means. In such an event, and with attention being directed again to FIG. 1 of the drawings, a plurality of pivotal mounting shafts are provided as at 25, with each of these pivot shafts being arranged to support individual spring rib members 26 and 27 extending between shafts 25 and the forward portion of the cutter 10. The forward end of the individual spring members 26 and 27 are coupled to and support, in part, the forward frame portion of the cutter, including the cutter bar. The individual spring rib members 26 and 27 provide free-floating support for the cutter and the drive means and share the entire load with one or more ground running shoes for effective close cutting in rough terrain.

For controllable rockable pivotal motion of the cutter 10 during operation, a radius or belt-tightener rod 31 is provided, with such rod being arranged at one lateral end of the structure. The radius or belt-tightener rod is pivotally suspended from the transverse bracket or cross-member 11 and pivotally coupled to the drive unit by means of a pair of mounting pins 32 and 33. Each of these mounting points are provided by means of a bolt or other shaft element providing for pivotal motion therearound. In order to achieve proper running condition for belt member 16, it will be observed that rod 31 extends generally parallel to the axis of the straight running portion of wobble shaft 35, thus providing for upwardly and downwardly pivotal motion of the cutter 10 and wobble drive means about mounting points 25, without significantly altering, changing or modifying the length requirements of belt 16. This preservation of drive belt length is further accomplished by virtue of idlers 18 and 19 which have been previously discussed. Also, as is apparent in the view of FIG. 3, the individual disposition of each of idlers 18 and 19 is readily controlled by means of the pulley mounting scheme illustrated.

Figure 4:
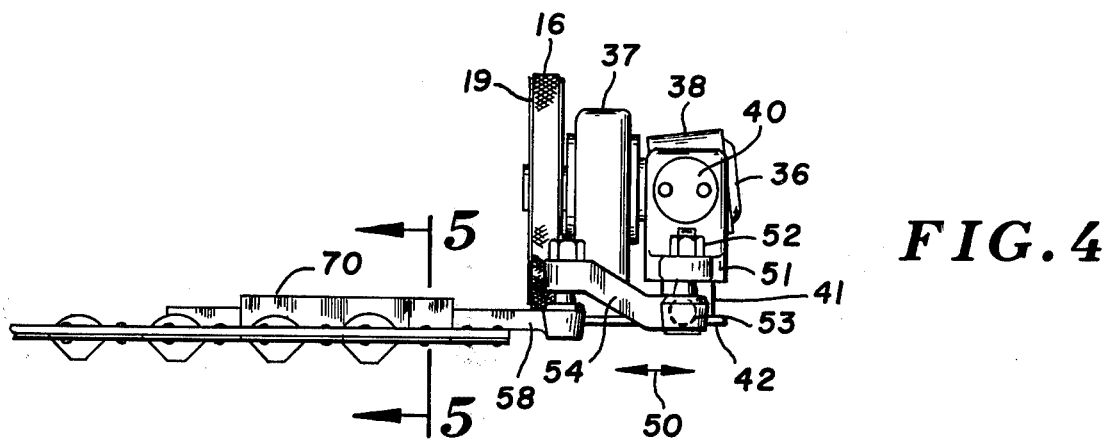
FIG. 4 is a vertical sectional view taken along the line and in the direction of the arrows 4—4 of FIG. 3 with the knife blade and guard fingers being shown in full elevational form for clarity.
Figure 5:
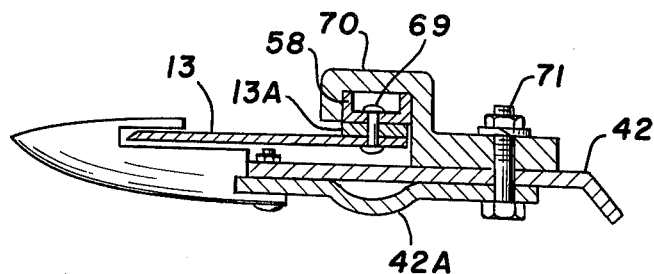
FIG. 5 is a vertical sectional view taken along the line and in the direction of the arrows 5—5 of FIG. 4, with FIG. 5 being drawn to a slightly enlarged scale.

Turning now to the details of the wobble drive 14, attention is directed to FIG. 2 wherein these details are illustrated in enlarged scale. Pulley 19 is fast on shaft 35 and may be on either side of bearing block 37 for belt alignment, with shaft 35 having an axial offset portion at 36. A pair of bearing members are provided for the drive shaft 35 including a first bearing block 37 and a second bearing block 38 for the axial offset portion 36. Bearing member 38 is mounted by yoke means to "U" shaped drive yoke 39, with a first axis for such gimbal mounting being provided horizontally by trunion and bearing assembly 40 and 40A, and with vertical motion being accommodated by shaft 41 which is a portion of yoke 39 and extends through the bearing mount on the basic frame base mounting plate 42. Yoke 39 has a drive bracket 51 extending forwardly therefrom, which is bored to receive drive pin 44 therewithin. As will be apparent from FIG. 4, drive pin 44 is provided with a ball coupling at the base thereof, the ball being received within a socket assembly such as is illustrated by broken lines in FIG. 4. Mounting plate 42 is secured to cutting bar 42A.

With continued attention being directed to FIG. 2, oscillatory motion of the yoke 39 is translated into linear reciprocatory motion as illustrated by arrows 50. This motion is, as previously indicated, straightforward and virtually lacking in components tending to drive in other than linear reciprocatory directions. For achieving such a translation of motion, drive pin 44 is secured to bracket member 51 by means of a nut such as at 52. A ball and socket joint is provided as at 53 (FIG. 4), with the socket being in connecting rod and link 54. A second drive pin and ball is provided as at 55, this drive pin being, of course, identical to drive pin 44. At the base of drive pin 55, a second ball is provided, with this ball being received within the confines of second ball receiving socket assembly 57. A ball receiving socket is received within a cylindrical cavity formed in link member 58, the outer end of link member 58 being, in turn, secured to the reciprocating tool means, specifically the cutter of sickle 10.

As has been indicated, a pair of ball and socket joints are provided as at 53 and 57. For a proper translation of motion, it is preferred that the longitudinal axis of link member or arm 54 be generally in alignment with the axis of the elongated cutting tool. Such an arrangement of components provides for improved translation of motion, and further contributes to elimination or reduction of components of motion which are other than along the axis of the elongated cutting tool.

As has been indicated, a pair of ball and socket joints are provided in the linkage means which couple the motion of the U shaped yoke 39 to the cutter. These joints are provided as at 53 and 57, and are generally at opposed ends of link 54. Each of the joints are identical, one to another, and hence a description of that joint illustrated in FIG. 4 will be deemed sufficient. Specifically, the ball and socket joint is confined within the cylindrical chamber formed in ink member 58. The ball and socket joints are of conventional style and are commercially available. Also, lubrication means may be provided.

As is apparent in FIG. 2, the entire drive assembly is securely mounted to cutter bar 42A and thus a stationary mounting plate or bracket may be provided for the wobble shaft drive. In addition, the individual ball and socket joints and linkage means are coupled closely together, one to another, and also to the elongated cutter, thus reducing the length of the drive and the overall weight of the system, and thus reducing wear, and accordingly, the vibration and inertia loading. Timing is preserved regardless of and independent of up or down motion. The coupling between member 58 and the cutter is simple, such as in the form of rivet coupling or the like as at 69. Because of the coupling arrangement, member 58 is secured against motion other than axial by means of U shaped bracket or channel 70 which is, in turn, secured rigidly to cutter bar or frame 42A by means of rivets or bolts as at 71.

While the drive means of the present invention has been illustrated as having a generally horizontally disposed mounting disposition, it will be appreciated that other mounting dispositons are suitable for the drive means, and these dispositions may include vertical as well as horizontal dispositions. In other words, the arrangement of components includes means whereby the angular disposition of the drive member may shift relative to the angular disposition of the driven member, however this shifting may occur without change in the lineal distance or separation between the two members. Thus, the ultimate arrangement is one which is solid and capable of a wide variety of applications. High cycle rates are accordingly possible with the generation of only modest, if any, vibration.

Figure 6:
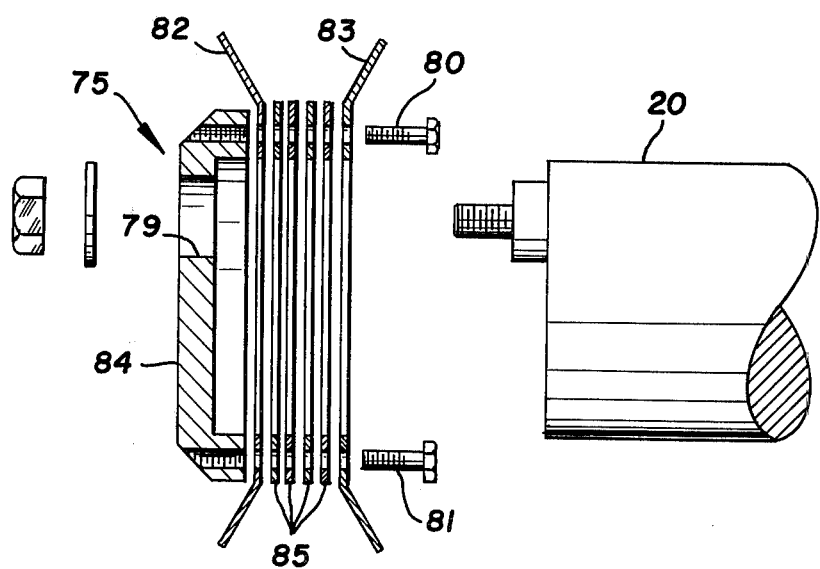
FIG. 6 is a diametrical sectional view of a pulley member for use with an eccentric shaft member with the shaft member being shown removed therefrom, FIG. 6 being drawn to a slighty enlarged scale.

Attention is now directed to FIG. 6 of the drawings along with attention being continued to FIG. 3. While any conventional pulley system may be utilized, pulley 75 is shown for fitting on a conventional Pitman drive. In the event motion of shaft 20 is eccentric, pulley assembly 75 will be utilized in order to convert the eccentric motion to concentric drive. Such shaft arrangements are common wherein Pitman drives are utilized for grain harvesting devices such as floating sickle bars and the like. Adjustment of such a pulley arrangement is achieved through an initial setting of the eccentric components, followed by a secure keying or other attachment of pulley 75 to shaft 20, with the tip of the eccentric shaft being secured in bore 79. Bolts 80 and 81 may be utilized to couple sheave elements 82 and 83 to backing plate 84, with spacers 85—85 being employed as required, to accommodate drive speed.

Relating this overall structure to the arrangement illustrated in FIG. 3, the drive means including the radius or belt-tightening rod 31 retains the cutting bar 42A at a fixed distance from pivot point 32. Thus, any rocking motion of member 42A relative to point 32 can be accommodated without significantly altering the drive length required for belt 16. Such an arrangement is provided in order to add greater versatility to the drive system of the present invention.

I claim:
1. In combination with a cutting bar and axially elongated cutting tool means moving in a linear reciprocatory path relative to said bar, drive means mountably secured to said cutting bar for converting rotational drive motion to linear reciprocatory motion for driving said cutting tool means and comprising:
   a. wobble shaft drive means including a driven shaft having an axial offset portion, pulley means fast on said driven shaft, first and second bearing means mounted on said driven shaft and including a first bearing means coupled to said cutter bar and a second bearing means mounted about said axial offset portion, yoke means including a generally U shaped yoke member coupled to said second bearing means and to said cutter bar means and having connecting arm means coupling said U shaped yoke member to said cutting tool means;
   b. said connecting arm means being generally axially aligned with said cutting tool means and including first and second link means with said first link means having first and second ball and socket joints coupled to opposed ends thereof, with said first link means being coupled to said U shaped yoke member through said first ball and socket joint, and to said second link means through said second ball and socket joint.

2. The combination as set forth in claim 1 being particularly characterized in that said second link means is coupled to said cutting tool means and with alignment guide means retaining said second link means in axially aligned relationship to said cutting tool means.

3. The combination as set forth in claim 2 being particularly characterized in that said alignment guide means includes a generally inverted U shaped channel member.

4. The combination as set forth in claim 1 being particularly characterized in that said first and second ball and socket joints are each in generally axially aligned relationship with said cutting tool means.

5. The combination as set forth in claim 1 being particularly characterized in that said drive means includes an endless drive system for delivering rotational energy to said driven shaft.

6. The combination as set forth in claim 1 being particularly characterized in that said U shaped yoke includes a bracket extending laterally from one leg thereof, and said first link means is coupled to said bracket.

7. Remote drive assembly means including a harvesting vehicle with chassis means, a source of rotational energy having a drive pulley thereon for drivably coupling an implement assembly with a floating cutter means and attached forwardly of said chassis means and having driven pulley means secured to said floating cutter;
   a. pivotally rocking radius rod extending between said chassis means and said floating cutter means and pivotally coupling said floating cutter means to said chassis means at an intermediate point along said radius rod, with said intermediate point being generally adjacent said drive pulley and spaced vertically therefrom;
   b. first and second pulley idler means coupled to said radius rod and being disposed at generally equal distances laterally from and on opposite sides of said drive pulley, thus forming a drive belt span of generally triangular configuration so as to provide a substantially constant drive length for said belt between said drive pulley and said driven pulley means.

8. In combination with a cutting bar and axially elongated cutting tool means moving in a linear reciprocatory path relative to said bar, said cutting bar including frame means, drive means mountably secured to one lateral end of said frame means for converting rotational drive motion to linear reciprocatory motion for driving said cutting tool means and comprising:
   a. wobble shaft drive means including a driven shaft having an axial offset portion, pulley means fast on said driven shaft, first and second bearing means mounted on said driven shaft and journalling said driven shaft for rotation therein and including a first bearing means having means coupling said first bearing means to said cutting bar frame, and a second bearing means mounted about said axial offset portion, yoke means including a generally U shaped yoke member coupled to said second bearing means and to said cutting bar frame means and having connecting arm means coupling said yoke member to said cutting tool means, said connecting arm means having a pair of angularly adjustable couplings therewith for driving said cutting tool means in an axial direction substantially free of angular forces other than in said axial direction.

9. In combination with a cutting bar and axially elongated cutting tool means moving in a linear reciprocatory path relative to said bar, said cutting bar including frame means, drive means mountably secured to one lateral end of said frame means for translating rotational drive motion to linear reciprocatory motion for driving said cutting tool means and comprising:
   a. wobble shaft drive means including a driven shaft having an axial offset portion, pulley means fast on said driven shaft, first and second bearing means mounted on said driven shaft and journalling said driven shaft for rotation therein and including a first bearing means having means coupling said first bearing means to said cutting bar frame, and a second bearing means mounted about said axial offset portion, driven means including a generally U-shaped yoke member having means coupling said yoke member to said cutting bar frame means for limited relative motion therewith, and connecting link means coupling said yoke member to said cutting tool means for transmission of translated rotational to reciprocatory motion from said yoke means to said cutting tool means, said connecting link means having a pair of angularly adjustable couplings therewith for driving said cutting tool means in an axial direction substantially free of angular forces other than in said axial direction.

10. In combination with a cutting device including a cutter bar and an axially elongated cutting tool means moving in a linear reciprocatory path relative to said cutting bar, drive means mountably secured to one lateral end of said cutter bar for translating rotational drive motion to linear reciprocatory motion for driving said cutting tool means, said combination comprising:
    a. wobble shaft drive means including a driven shaft having an axial offset portion, pulley means fast on said driven shaft, first and second bearing means mounted on said driven shaft and journalling said driven shaft for rotation therein and including a first bearing means having means coupling said first bearing means to said cutter bar, and a second bearing means mounted about said axial offset portion, driven means including a generally U-shaped yoke member having means coupling said yoke member to said cutter bar for limited relative motion therewith, and connecting link means coupling said yoke member to said cutting tool means for transmission of translated rotational reciprocatory motion from said yoke means to said cutting tool means, said connecting link means having a pair of angularly adjustable couplings therewith for driving said cutting tool means in an axial direction substantially free of angular forces other than in said axial direction.

11. The combination as defined in claim 10 being particularly characterized in that support means are provided for said cutter bar.

* * * * *